Dec. 7, 1926.  
W. J. LEWIS  
1,609,753  
CHILLING AND MOLDING APPARATUS  
Filed Nov. 27, 1925   3 Sheets-Sheet 1
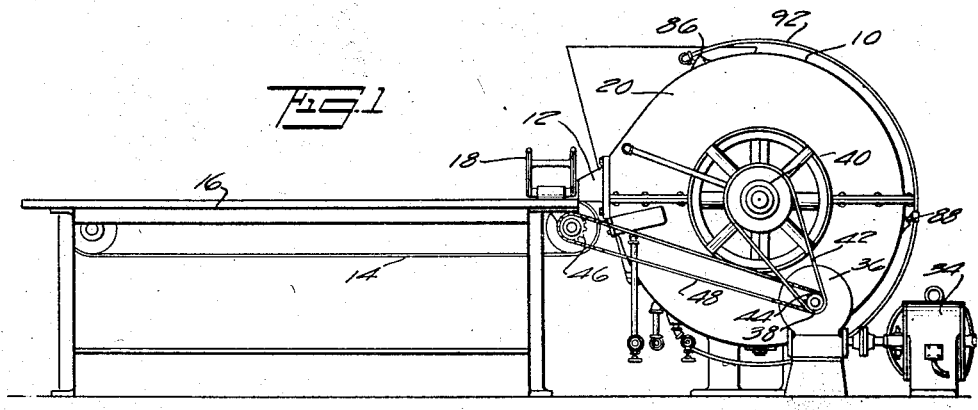
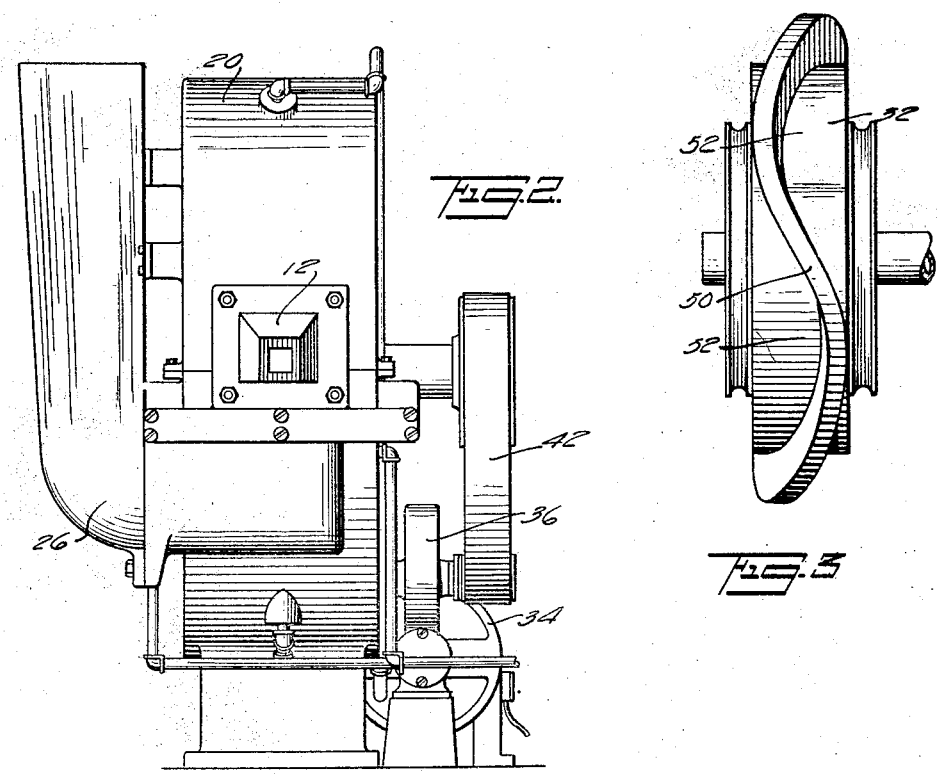
INVENTOR  
William J. Lewis  
BY  *H. H. Dyke*  
ATTORNEY

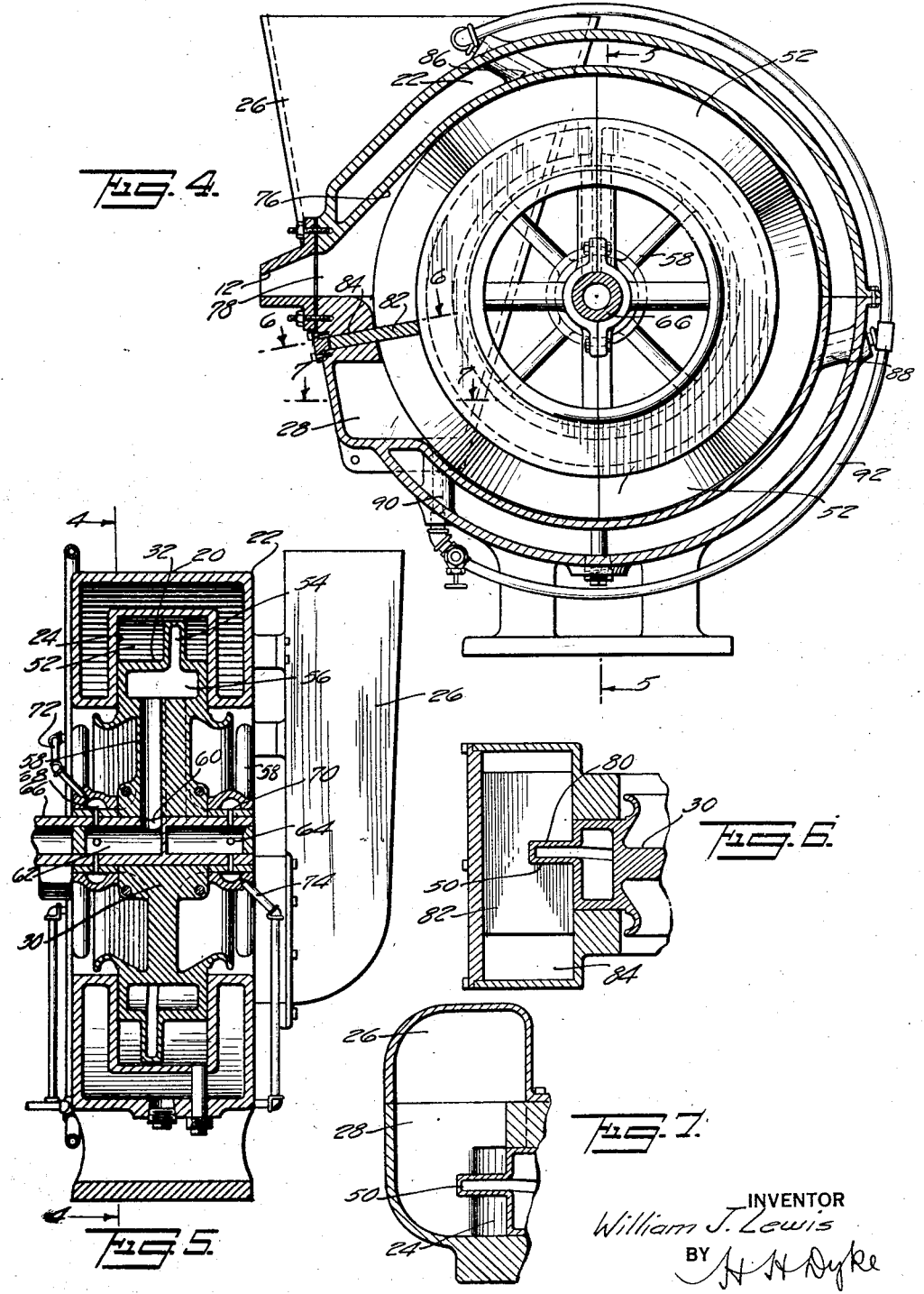

Dec. 7, 1926.
W. J. LEWIS
1,609,753
CHILLING AND MOLDING APPARATUS
Filed Nov. 27, 1925    3 Sheets-Sheet 3
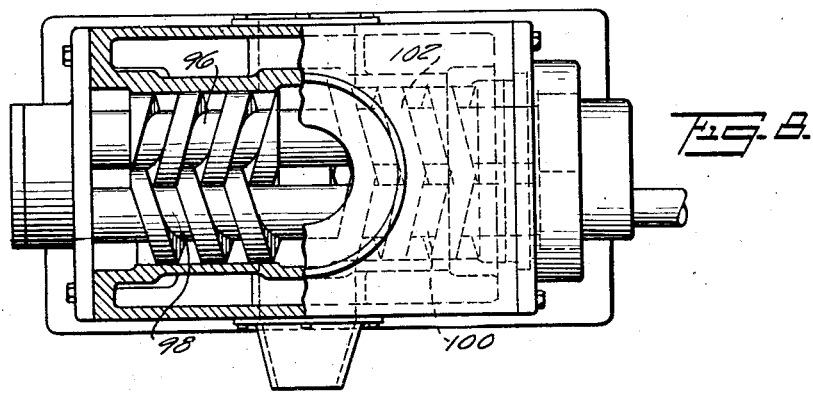
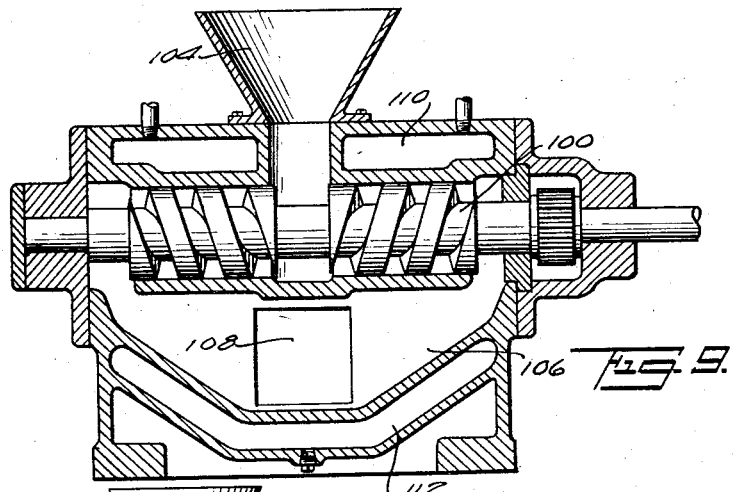
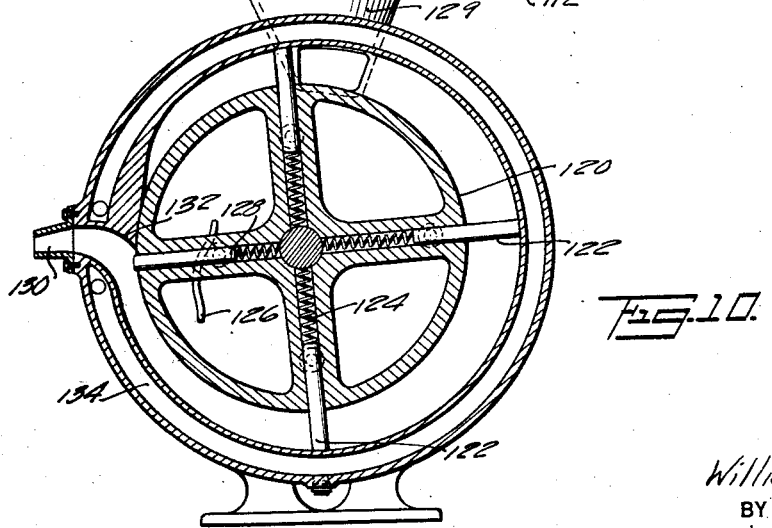
INVENTOR
William J. Lewis
BY
ATTORNEY Patented Dec. 7, 1926.

1,609,753

UNITED STATES PATENT OFFICE.

WILLIAM J. LEWIS, OF OTTAWA, ONTARIO, CANADA, ASSIGNOR OF ONE-HALF TO CHARLES HENRY LEBARGE, OF OTTAWA, CANADA.

CHILLING AND MOLDING APPARATUS.

Application filed November 27, 1925. Serial No. 71,550.

My invention is of a chilling and molding apparatus and process for plastic materials.

An important field of application of the apparatus and process of my invention is in producing print or die molded butter direct from the churn, dispensing with the intermediate subjection to refrigeration which has been required prior to molding into print form.

My invention will be best understood from the following description of apparatus by which the invention can be carried into effect.

In the accompanying drawings, Fig. 1 is a side view and Fig. 2 an end view of chilling and molding apparatus. Fig. 3 is a detail perspective on an enlarged scale of a rotary impelling member having a continuous sinuous impelling flange. Fig. 4 is a sectional view of the chilling and molding apparatus taken on line 4—4, Fig. 5. Fig. 5 is a section on line 5—5, Fig. 4. Figs. 6 and 7 are sections on line 6—6 and 7—7 respectively of Fig. 4. Figs 8 and 9 are respectively a plan view with parts broken away, and a longitudinal section of a modified form of apparatus making use of a screw impeller. Fig. 10 is a sectional view of a further modification employing an eccentrically mounted impeller with spring projected vanes.

The chilling and molding apparatus 10, Fig. 1, is arranged with its discharge die 12 delivering to a conveyor belt 14 on the table 16, which is equipped with a cutting off device 18. Various other forms of delivery apparatus may be used, if desired.

The chilling and molding apparatus indicated generally by reference character 10 comprises a casing 20 jacketed substantially all the way around as indicated at 22 for receiving a refrigerant, such as cold brine, for example. The jacket space 22 is preferably substantially U-shaped in cross-section (Fig. 5) and provides within the jacket and annular channel 24 for the butter or other plastic material, which is delivered thereto from the feed hopper 26, a lateral extension 28 from hopper 26 being in communication with the channel 24 as shown in Figs. 4 and 7.

The rotary impeller wheel 30 turns within the casing 20 in an anti-clockwise direction as viewed in Fig. 4, and its peripheral wall 32 completes the enclosing of the annular passage 24. Wheel 30 is positively driven, preferably at a relatively slow speed, as by means of the motor 34, speed transformer in housing 36, and belt pulleys 38 and 40 connected by the driving belt 42. The conveyor belt 14 may be driven from the same source of power, as through sprocket gears 44 and 46 and the sprocket chain 48.

The impeller wheel 30 is provided on its peripheral wall 32 with the continuous sinuous flange 50 forming within the passage 24 a series of alternate pocket spaces 52, 52, on its opposite sides according as the sinuousness of flange 50 takes it to or away from one or the other of the sides of the peripheral wall 32, as shown clearly in Fig. 3.

The wheel 30 and flange 50 are preferably cored out as indicated at 54, 56 for reception of a refrigerant, such as brine, for example. In the form shown the spokes 58 are hollow and communicate at their outer ends with chamber 54, and at their inner ends communicate preferably alternately through openings 60 with supply and exit chambers 62, 64 in the hollow shaft 66, to and from which the refrigerant is respectively supplied and withdrawn through the glands 68, 70 by the supply pipe 72 and return pipe 74, which also serve to circulate the brine or other refrigerant from any suitable source through the jacket chamber 22 in casing 20.

At its outlet end 76 the passage 24 communicates at 78 with the discharge die 12, through which the butter or other plastic material is extruded.

Between the hopper supply passage 28 and the outlet chamber 78 the flange 50 passes through the closely fitting slot 80 in the sliding gate member 82, which is adapted to have a limited lateral reciprocating movement in the slideway 84. See Fig. 6. If any of the plastic material being operated on, as, for example, butter, should get past the gate member 82 it results merely in a slight transfer of worked and kneaded plastic material ready for discharge getting into the feed material, which is in no way detrimental. There is no possibility of transfer in the opposite sense, which would be undesirable.

Provision is made for cleaning, as, for example, a series of steam jets 86, 88, 90 fed from pipe 92 may be arranged at intervals about the passage way 24 and, except for jet 90 directed toward the feed hopper, are preferably arranged to discharge at an angle to the walls of the passage 24 and in a direction reverse to the path of movement of impeller 30. A preferably plugged cleanout or drain opening is provided at the lowest point in the annular passage 24.

As the impeller 30 revolves, butter, preferably unrefrigerated and fresh from the churn, is fed into hopper 26, which is so located as to secure maximum extent of travel in contact with the cold walls of passage 24, and passes from the extension 28 of hopper 26 into pockets 52 between flange 50 and the side walls of passage 24, and is carried along with the impeller 30 throughout its rotation until the gate member 82 is encountered, whereupon the forward movement of the butter is stopped and pressure built up in chamber 78, resulting in the extrusion of the butter or other plastic material through die 12, in condition to be cut into print size. Throughout its passage the butter is subjected to refrigeration preferably on all sides, and by the time of its delivery to the compressing chamber 78 it is thoroughly chilled as well as worked so as to be in proper condition for forming into print butter. The extrusion action is localized in chamber 78 and die 12 and is not sufficient to unduly express the water content from the butter, which is delivered at the die in good condition for formation into prints and with water content not unduly low.

In the apparatus illustrated in Figs. 8 and 9 I dispense with gates, and make use of oppositely directed, geared together, closely meshing screw plugging members 96, 98 and 100, 102, which take the butter from feed hopper 104 and deliver it through chamber 106 to the discharge die 108, the butter being refrigerated by action of brine in the jackets 110, 112.

In the form of Fig. 10 the eccentrically mounted rotating impeller 120 has vanes 122 projected by springs 124 and carried back by cam 126, coacting with rollers 128 at the discharge region, where the material, supplied through hopper 129, is directed out through extrusion die 130 by the deflector 132. Chilling is accomplished by brine or other refrigerant in the jacket 134. These are but a few of the many devices which can be used for carrying out my invention in its broadest aspects.

It is to be understood that the forms of apparatus shown and described are for affording an understanding of the invention and not for its limitation, the scope of the invention being as defined by my claims, by which I intend to claim all that is permissible in view of the prior art.

I claim :—

1. Apparatus for refrigerating and molding plastics, comprising a member containing a channel the walls whereof are refrigerated, an impeller comprising a continuous sinuous flange traversing said passage, a die communicating with the passage, and a reciprocable gate member having a slot for passage of the said flange.

2. Apparatus for molding plastics, which comprises a casing containing a substantially annular channel, a rotary impeller in said channel, and a sliding gate extending across the channel having a passage therein which is closely fitted by the impeller, a hopper communicating with said channel on one side of the gate, and a die in communication with the channel on the other side of said gate.

3. Apparatus for refrigerating and molding plastic material, such as butter, comprising a jacketed casing containing a substantially annular passage the walls whereof are refrigerated from refrigerant within the jacket, a rotary impeller the peripheral wall whereof completes the passage enclosure, a continuous sinuous flange on said impeller within the passage, a transversely slidable gate member having a slot for passage of said flange, feeding means communicating with said passage on one side of said gate member, and an extrusion die communicating with said passage on the opposite side of said gate member.

4. Apparatus for molding plastics, which comprises a casing containing a substantially annular channel, a rotary member provided with continuous sinuous impeller means arranged to traverse said channel, a sliding gate slotted for passage of said impeller means, means for supplying plastic material to the channel on one side of said gate, and a die in communication with the channel on the other side of said gate.

In testimony whereof, I have signed my name hereto.

WILLIAM J. LEWIS.